3,123,471
NICKEL BONDING METHOD
Robert W. Marshall, Roseville, Mich., assignor to Chrysler Corporation, Highland Park, Mich., a corporation of Delaware
No Drawing. Filed Apr. 7, 1960, Ser. No. 20,519
6 Claims. (Cl. 75—208)

This invention relates to an improved assembly, bond, and method of bonding metal parts together.

More specifically, the invention pertains to the formation of a true metallurgical bond between surfaces of two metal parts, at least one of which comprises metal powder.

One of the main objects of the invention is to provide a secure bond between two metal parts by a metal bonding strata therebetween which is metallurgically bonded to both parts by heat without exceeding the melting temperatures of either of the parts or the metal of the bonding strata.

Another object of the invention is to provide a metallurgical and mechanical bond of high shear strength between an assembly of parts composed of the same or different metal powder compositions which bond may be formed simultaneously with the sintering of one or both parts of the assembly.

A further object is to form a metallurgical and mechanical bond between separate porous metal parts by means of a bonding layer of nickel interposed between the joining faces of said parts and diffused to a limited degree into said parts without forming a molten phase in the joint.

Other objects of the invention are to provide by immersion plating, nickel coatings on the joining faces of an assembly of porous iron metal parts; to provide nickel layers of this kind which are sufficiently free from gases and salts to allow penetration of said layers into each other and into the parts at temperatures below the melting points of the metals of the parts and the nickel layers; and to provide a bonding process of this character which is particularly adapted to metallurgically bond together parts having a relatively high iron content.

These objects are accomplished in the present invention by providing a thin plating of nickel on the joint surfaces of either powdered metal articles or solid metal articles containing considerable iron, placing these joint surfaces by pressure into intimate contact and heating in at least an inert, but, preferably a reducing atmosphere to approximately between 2,000° F. and 2,100° F. which range is considerably below the melting point of nickel but which is sufficiently hot to cause the plated nickel to metallurgically bond under slight pressure to the adjacent metal surfaces and thereby securely bond them together.

It has been found that this method is very successful in bonding together articles of powdered metals and in particular iron base powdered metal articles. The bond results from a metallurgical combination of the iron and nickel, and also from a mechanical locking of the iron and nickel caused by a partial diffusion of the nickel into the pores of the powdered metal.

The type of iron of which the powdered metal article is composed is important since certain iron types will shrink and others will expand upon heating. For example, briquettes made from mill scale will shrink on sintering or remain the same size while briquettes from reduced magnetite ore will grow. It is seen, therefore, that if the green powdered metal articles are not properly chosen with respect to their growth, upon sintering a tight fit between the articles being joined and hence a good bond will not be obtained. For example, a briquette core of reduced magnetite ore and a surrounding briquette from mill scale each when sintered simultaneously, will grow against each other and provide a very tight pressure fit therebetween if initially properly dimensioned. If the nickel plating, therefore, is provided on the adjacent joint surfaces of these two pieces their subsequent sintering will provide a good nickel joint between the two pieces since the nickel coating will be placed under pressure by the growth of the magnetite.

It is obvious that an apparatus can be provided for tightly compressing the two pieces of powdered metal together during the sintering thereof in order to insure the proper nickel bond, and in such a case, the non-growth or shrinkage of the powdered metals used will not affect the result.

It is particularly noted that it is not necessary to sinter the powdered metal article simultaneously with the formation of the nickel bond and the previously sintered briquetted articles may be bonded with the nickel plating in the same manner as the unsintered articles.

The plating operation is carried out in a nickel chloride bath of a recommended but not critical concentration of 80 to 100 grams of nickel chloride to 100 cc. of water. The nickel chloride is in the form of $NiCl_2.6H_2O$. The briquettes are preferably surface degreased prior to immersion in the nickel chloride solution. The temperature of the bath is approximately 190° to 200° F. and the immersion time is approximately fifteen minutes. The parts should not be placed close together in the bath and should be slightly agitated to allow the plating process to proceed uninhibited by any lack of flow of the bath around the joint surfaces of the briquette. After the plating, the parts should be thoroughly rinsed in hot water since the salts from the solution if left in the nickel plating would, upon heating, impair the bond. If copper is present in any significant concentration in the briquetted article, the subsequent heating of the articles to produce the nickel bond should be carried out in an endothermic (reducing) atmosphere since dissolution of the copper into the nickel would impair the bond.

In the plating process, the nickel will displace iron from the briquette surface and the iron will eventually become oxidized and precipitate as ferric oxide which should periodically be removed from the plating bath.

I claim:
1. The method of manufacturing a metallurgically bonded together assembly comprising a first powdered metal part having a portion surrounded by a portion of a second powdered metal part, which consists in compressing first to a briquette of a desired shape a first charge of metal powder of the type which grows upon sintering, compressing a second charge of a metal powder of the type which shrinks upon sintering to a second briquette of a desired shape having a passage for receiving a portion of said first briquette in close fitting relationship, immersing said briquettes in a nickel immersion plating bath to form thereon layers of nickel, assembling said briquettes with a portion of said first briquette fitted in the passage of said second briquette and simultaneously sintering said first and second briquettes and bonding them together under the pressure resulting from growth and shrinkage respectively of said first and second briquettes by heating said assembly in a reducing atmosphere and at a sintering temperature not in excess of the melting point of said nickel layers.

2. The method of manufacturing a bonded together assembly comprising a first iron powder part having a portion surrounded by a portion of a second powdered iron part, which consists in compressing to a first briquette of a desired shape a first charge of iron powder derived from magnetite ore which iron powder grows upon sintering, compressing a second charge of iron powder derived from reduced mill scale which shrinks upon sintering to a second briquette having a passage for receiving at least a portion of said first briquette in close fitting relationship, immersing said briquettes in a nickel immersion plating bath to form thereon layers of nickel, assembling said briquettes with a portion of said first briquette fitted in the passage of said second briquette, and simultaneously sintering said first and second briquettes and bonding them together under the pressure resulting from growth and shrinkage respectively of said first and second briquettes by heating said assembly in a reducing atmosphere and at a sintering temperature not in excess of the melting point of said nickel layers.

3. The method of manufacturing a bonded together assembly comprising a first iron powder part having a portion surrounded by a portion of a second powdered iron part, which consists in compressing to a first briquette of a desired shape a first charge of iron powder derived from magnetite ore which iron power grows upon sintering, compressing a second charge of iron powder derived from reduced mill scale which shrinks upon sintering to a second briquette having a passage for receiving at least a portion of said first briquette in close fitting relationship, assembling said briquettes with a portion of said first briquette fitted in the passage of said second briquette and simultaneously sintering said briquettes and compressing them together under the pressure resulting from growth and shrinkage of said first and second briquettes respectively by heating said assembly in a reducing atmosphere at a sintering temperature.

4. The method of manufacturing a bonded-together assembly comprising a first iron powder part having a portion in contact with a portion of a second powdered iron part which comprises compressing to a first briquette of a desired shape to make said first part a first charge of iron powder derived from magnetite ore which iron powder grows on sintering; compressing a second charge of iron powder derived from reduced mill scale which shrinks upon sintering to a second briquette to make said second part, bringing said contacting portions of said parts together in intimate contact under pressure and simultaneously heat sintering said briquettes while supplementing said pressure contact by the pressure resulting from growth and shrinkage of said briquettes respectively by said heating.

5. The method of manufacturing a bonded-together assembly comprising a first powdered iron part having a portion surrounded by a portion of a second powdered iron part, comprising compressing to a first briquette of a desired shape a charge of a first composition essentially of iron powder derived from magnetite ore which composition grows on sintering, compressing a second charge of a powdered iron composition to a second briquette having a passage for receiving at least a portion of said first briquette in close fitting relationship, said second composition having a dimensional change characteristic upon sintering ranging from shrinkage to substantially no growth whereby said first briquette will grow and press against said second briquette when sintered simultaneously, assembling said briquettes with a portion of said first briquette fitted in the passage of said second briquette, simultaneously heating said briquettes to a sintering temperature to sinter said briquettes, and effecting a pressure fit between said briquettes by the pressure resulting from the relative change in dimensions between said briquettes during sintering.

6. The method of claim 5 including the step of immersion nickel plating at least the portions of said briquettes which are to be fitted together.

References Cited in the file of this patent

UNITED STATES PATENTS

| | | |
|---|---|---|
| 1,766,865 | Williams et al. | June 24, 1930 |
| 1,903,077 | Wolf | Mar. 28, 1933 |
| 2,161,597 | Swartz | June 6, 1939 |
| 2,341,860 | Ellis | Feb. 15, 1944 |
| 2,646,456 | Jacquier | July 21, 1953 |
| 2,769,611 | Schwarzkopf | Nov. 6, 1956 |
| 2,863,211 | Wellman | Dec. 9, 1958 |